United States Patent [19]

Heinle et al.

[11] Patent Number: 4,848,444
[45] Date of Patent: Jul. 18, 1989

[54] PROCESS AND PROCESSOR FOR THE CONTROL OF PARAMETERS OF THE INTERIOR AIR IN A MOTOR VEHICLE HAVING AN AIR CONDITIONING SYSTEM

[75] Inventors: Dieter Heinle, Plüderhausen; Wolfgang Volz, Magstadt, both of Fed. Rep. of Germany

[73] Assignee: Daimler-Benz Aktiengesellschaft, Stuttgart, Fed. Rep. of Germany

[21] Appl. No.: 229,450

[22] Filed: Aug. 8, 1988

[30] Foreign Application Priority Data

Aug. 6, 1987 [DE] Fed. Rep. of Germany ....... 3726122

[51] Int. Cl.$^4$ .............................................. F24F 3/14
[52] U.S. Cl. .................................... 165/21; 62/176.6; 62/229
[58] Field of Search ................ 62/176.6, 90, 229, 208; 236/44.6; 165/21

[56] References Cited

U.S. PATENT DOCUMENTS 4,783,970  11/1988  Takahashi ......................... 62/176.6

FOREIGN PATENT DOCUMENTS

| | | |
|---|---|---|
| 2126599 | 5/1971 | Fed. Rep. of Germany . |
| 2405230 | 8/1974 | Fed. Rep. of Germany . |
| 3225622 | 2/1983 | Fed. Rep. of Germany . |
| 1573368 | 3/1986 | Fed. Rep. of Germany . |
| 2535083 | 4/1984 | France . |
| 0175412 | 10/1982 | Japan ................. 62/176.6 |
| 0083830 | 4/1986 | Japan ................. 62/176.6 |

Primary Examiner—William E. Wayner
Attorney, Agent, or Firm—Barnes & Thornburg

[57] ABSTRACT

A process and processor for an air conditioning system in which, in addition to the values recorded for the interior temperature, the outside air temperature, the temperature after the evaporator and the ventilation temperature after the heating element, the value recorded by a further sensor of the relative humidity of the outside air for controlling the relative humidity of the interior air are supplied to an evaluation unit and correspondingly further processed.

14 Claims, 2 Drawing Sheets

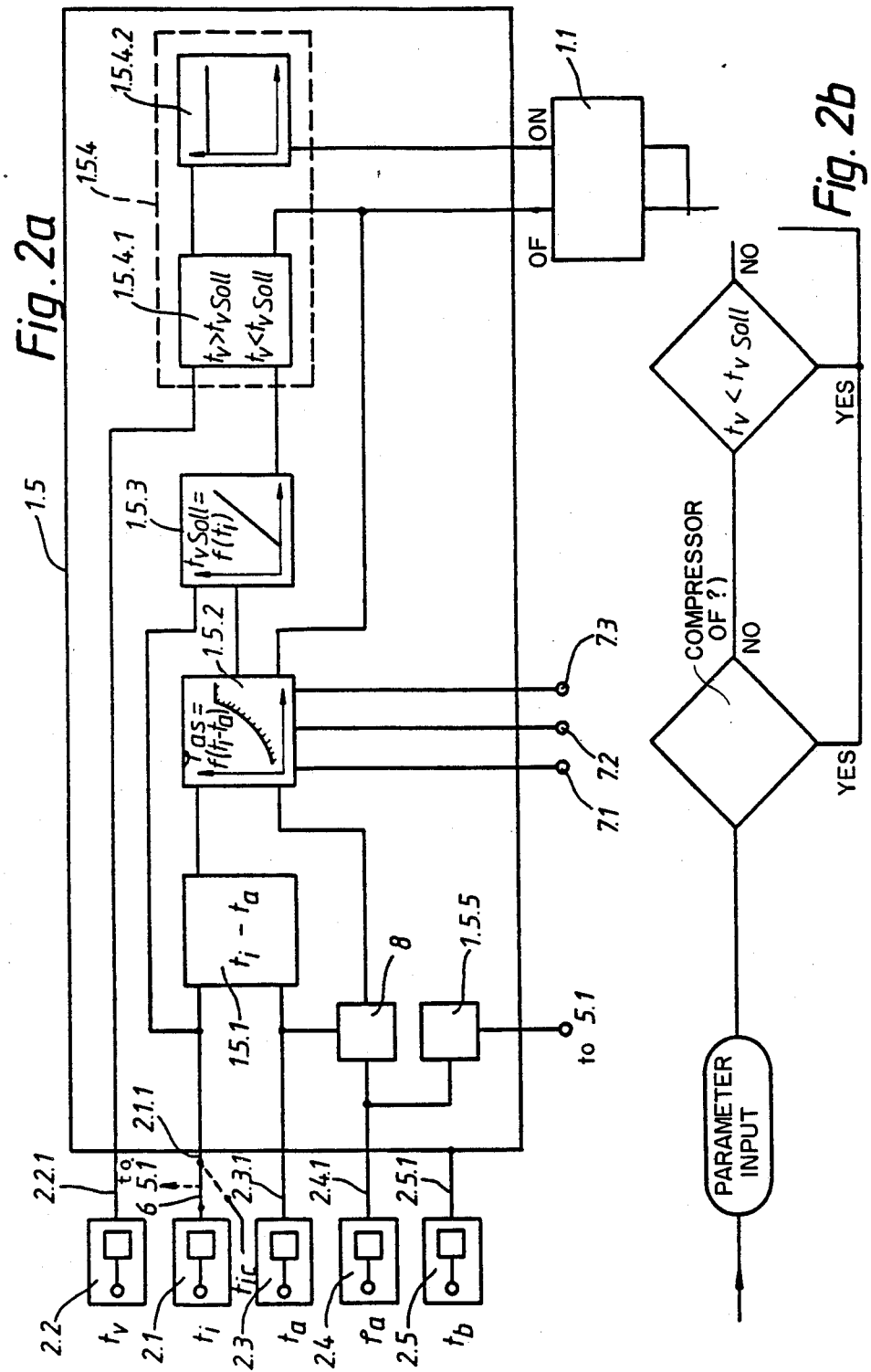

PROCESS AND PROCESSOR FOR THE CONTROL OF PARAMETERS OF THE INTERIOR AIR IN A MOTOR VEHICLE HAVING AN AIR CONDITIONING SYSTEM

BACKGROUND AND SUMMARY OF THE INVENTION

The present invention relates generally to air conditioning systems for motor vehicles and more specifically to an improved control therefore.

These air conditioning systems generally include a compressor, fan, condenser, evaporator and heating element and have an evaluation unit. The evaluation unit is supplied with values recorded by sensors arranged in the automobile for at least the interior temperature $T_i$, the outside temperature $T_a$, and the temperature after the evaporator. The evaluation unit then controls the interior temperature based on these readings. A process of this kind is known for example, from German Application No. 2,126,599.

In air conditioning systems for motor vehicles consisting essentially of a cooling and heating device, a distinction is to be drawn between two different control devices, namely automatic temperature control, automatic climate control.

In the case of automatic temperature control, the vehicle passenger has two options for maintaining a constant interior temperature by keyboard selection options. In the first selection option for the air conditioning system (=normal position), the air conditioning system switches on only if the temperature of the outside air is not sufficient to maintain the set nominal interior temperature. However, the windows of the vehicle can mist over on the inside when the outside air is very humid and no cooling is required from the point of view of temperature level. In order to avoid this misting, the second selection option offers the "reheat" function. The evaporator of the air conditioning system is always maintained at the lowest possible temperature, but above 0° C., so that the outside air supplied is dried by means of the cooling. In the subsequent heating heat exchanger, also known as counter-heating device, the cooled and dried air is reheated to the required ventilation temperature, so that a misting of the windows is avoided by the supply of dry outside air. However, since the compressor is also in operation when the temperature level of the outside air would not require a cooling, power is unnecessarily supplied by the vehicle engine for the compressor. In addition, dried air is continually supplied to the vehicle interior, so that the required minimum air humidity is not present in the interior.

The same also applies to the automatic climate control, which contains the abovementioned "reheat" function and further includes an automatic air supply and air amount control.

Independently of this, it is known in German Patent Specification No. 3,225,622, to control the air humidity in a closed space with an automatic air humidifier such that the actual value of the relative air humidity is measured, compared with a nominal value and the divergence is corrected by means of a control circuit.

In addition, a device for the control of a climate test chamber is known from German Auslegeschrift No. 1,573,368, in which both the air humidity and the air temperature from sensors arranged in the chamber are recorded and programmed changing climate investigations can be performed ovr periods of time of optional length.

Furthermore, a process for measuring the air humidity content is known from French Published Patent Application No. 2,535,083, in which a characteristic curve behavior, changing over time, of a hydrometer is compensated by correcting a characteristic curve stored in a microprocessor to maintain the measuring accuracy and consequently the accuracy of a control.

Particularly to avoid a misting of automobile windows, a device is known from German Auslegeschrift No. 2,405,230, in which a condensation of humidity on the surface of the window is determined from a change of resistance between two detector electrodes. In the case of falling below a predetermined resistance value, a detector and control circuit activates a window heating unit until, due to the window drying, the impedance between the detector electrodes has increased again so far that a signal to switch off the window heating is generated by the detector and control circuit.

The object of the invention is to further develop, with respect to control techniques a congeneric air conditioning system for the control of the temperature of the interior air such that a misting of the windows is avoided, but nevertheless a required minimum air humidity is maintained in the interior of the vehicle and the compressor is switched on and off automatically only when required.

These and other objects are provided by a process and processor which includes a further sensor for receiving the relative humidity of the outside air $\phi a$ and supplying it to the evaluation unit. The evaluation unit forms the difference between the inside and outside temperature $(t_i - t_a)$. The evaluation unit generates a first signal when the outside humidity $\phi a$ at the difference of inside to outside temperature exceeds an associated characteristic value $\phi as$ from a characteristic curve of $\phi as$ as a function of the difference of temperatures stored in a memory unit. In response to the first signal, a blow-out temperature $t_{vSoll}$ which is a function of the inside temperature is read from storage for the recorded value of the inside temperature. The compressor is switched on when the evaporator blow-out temperature is greater than the nominal evaporator blow-out temperature from the characteristic curve at the recorded inside temperature value. the characteristic curve for the relative humidity of the outside air is lowered if there are more people in the car, as measured by signals from the seat sensors. Also, the characteristic curve of the outside temperature may be raised as a function of the rotational speed of the fan. A lower fixed temperature value $t_{ic}$ is supplied to the evaluation unit instead of the recorded current value of the interior temperature $T_i$ when an recirculating-air-flap is deliberately actuated for the recirculating-air operating state. Based on the value of the relative humidity of the outside air $\phi a$, a third memory unit provides a signal to displace the operating state of the recirculating flap more in the direction of fresh air or recirculating air for a defined period of time. The recorded relative humidity of the outside air $\phi a$ is compensated as a function of the values recorded for the outside air temperature. In response to a signal dependent upon the nominal value of the interior temperature, generally set by the occupant, the characteristic curve of the relative outside humidity is raised or lowered within certain limits.

Other objects, advantages and novel features of the present invention will become apparent from the following detailed description of the invention when considered in conjunction with the accompanying drawings.

BRIEF DESCRIPTION OF THE DRAWINGS

FIG. 2a shows a block circuit diagram of the valuation unit of the air conditioning system.

FIG. 2b shows the associated flow chart,

DETAILED DESCRIPTION OF THE DRAWINGS

Figure 1:
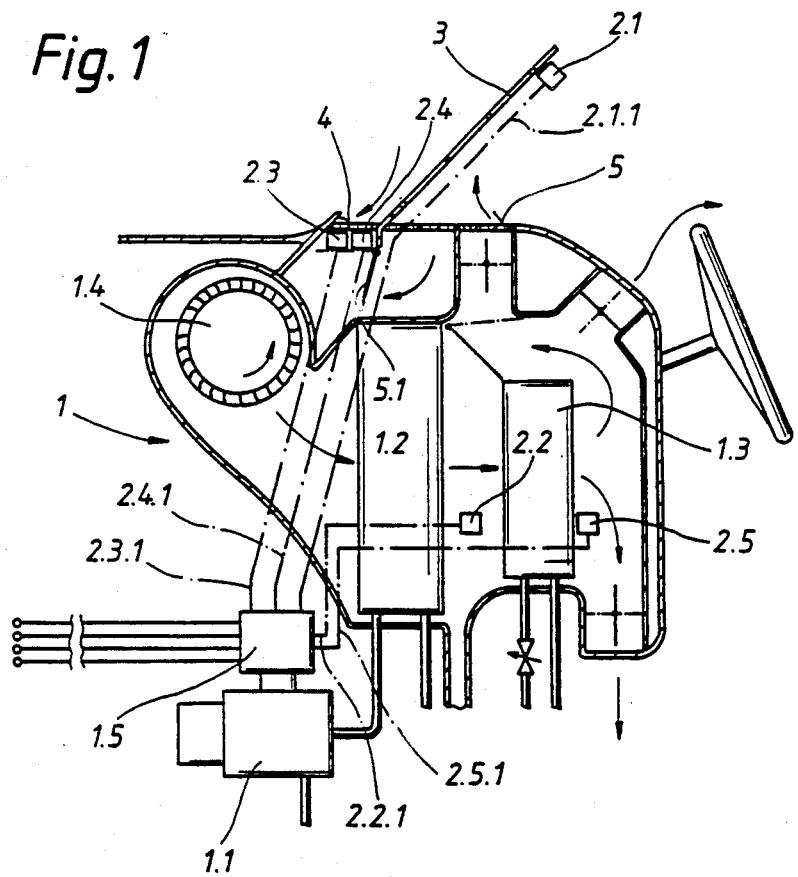
FIG. 1 shows a basic outline of the air conditioning system.

As is evident from FIG. 1, an air conditioning system is arranged in the engine space of a motor vehicle, consisting essentially of a compressor 1.1, an evaporator 1.2, a heating element 1.3, a fan 1.4, a condenser, not shown, arranged in the region of the cooler and an evaluation unit 1.5. In addition, several sensors with integrated measuring transducers are arranged in and on the vehicle, for instance a sensor 2.1 in the upper inner region of the windshield 3 for recording the interior temperature $t_i$, a sensor 2.2 between the evaporator 1.2 and the heating element 1.3 for recording the temperature $t_v$ after the evaporator, a sensor 2.5 behind the heating element 1.3 for recording the ventilation temperature $t_b$, a sensor 2.3 at the fresh air supply duct 4 in the lower outer region of the windshield 3 for recording the outside air temperature $t_a$ and a sensor 2.4 in the same region for recording the relative humidity $\phi a$ of the outside air, whose recorded values are supplied as output signals of the measuring transducers to the evaluation unit 1.5 via electrical conductors 2.1.1, 2.2.1, 2.3.1, 2.4.1 and 2.5.1. Adjacent to the fresh air supply duct 4, on the inner side of the windshield 3, there is a recirculating air duct. A flap 5.1 in the fresh air supply duct 4 can close it, for the so-called recirculating air operating state.

Figure 3:
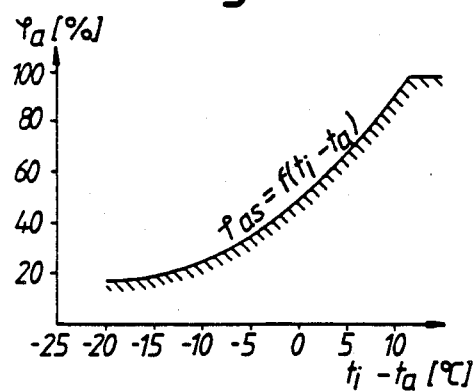
FIG. 3 shows the characteristic curve $\phi as = f(t_i - t_a)$.

As is evident from the block circuit diagram of the evaluation unit 1.5 and from the associated flowchart according to FIGS. 2a and 2b, the output signals of the measuring transducers of the sensors 2.1 to 2.4 are supplied to the evaluation unit via the electrical lines 2.1.1 to 2.4.1, wherein the difference between the interior temperature $t_i$ and outside air temperature $t_a$ is formed first of all in a subtraction element 1.5.1. Both this difference value $(t_i - t_a)$ and the value of the relative humidity of the outside air $\phi a$ are supplied to a memory element 1.5.2, in which a characteristic curve $\phi as = f(t_i - t_a)$ according to FIG. 3 is stored.

This characteristic curve was obtained as follows: Starting from the known Mollier h,x diagram, with the relative humidity of the outside air $\phi a$ in conjunction with the maximum air temperature which can be supplied to the heating element 1.3 at $\phi a$ and the outside air temperature $t_a$, dependencies of various interior temperatures $t_i$ at a defined relative humidity of the interior air $\phi i$ (for example, at $\phi i = 50\%$) can be derived and a host of limit characteristic curves leads, by forming the difference $(t_i - t_a)$ to the characteristic curve value $\phi as = f(t_i - t_a)$, on the basis of which now a first criterion is given whether the outside air must be cooled to a defined nominal evaporator blow-out temperature $t_{vSoll}$.

Figure 4:
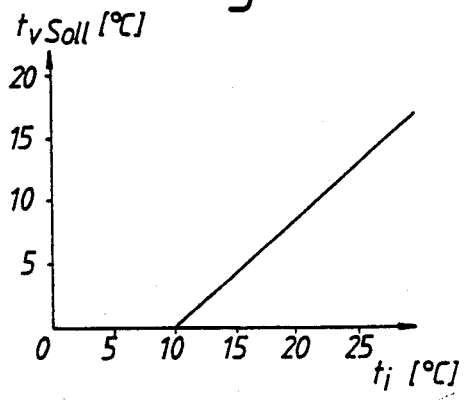
FIG. 4 shows the characteristic curve $t_{vSoll} = f(t_i)$.

If $\phi a$ at $(t_i - t_a)$ namely exceeds the associated characteristic curve $\phi as$, then a signal is formed by the memory element 1.5.2, which is supplied to a further memory element 1.5.3, at which the value of the interior temperature $t_i$ is also available. In the memory element 1.5.3, a characteristic curve likewise derived from the Mollier h,x diagram, of the nominal evaporator blow-out temperature $t_{vSoll} = f(t_i)$ according to FIG. 4 is stored, from which characteristic curve the value $t_{vSoll}$ at the available value $t_i$ is then read out on the basis of the signal. This value $t_{vSoll}$ is then supplied to a comparator 1.5.4.1 of a controller 1.5.4, at which the value of the temperature $t_v$ after the evaporator is furthermore also available. If a comparison obtains as a second criterion that $t_v < t_{vSoll}$, then a regulator element 1.5.4.2 of the controller is activated by the output signal formed on the basis of the deviation and the compressor 1.1 is switched on, as a result of which the outsie air is dried by cooling. It is thus achieved with this control process that, with a limiting of the interior humidity to a defined value, the dew point of the interior air on the windshield, assuming $t_{window\ inside} = t_a$ is not reached and consequently a misting of the windshield is effectively prevented.

In the exemplary embodiment, the controller 1.5.4 is designed as a two-position controller; if, however, an infinitely adjustable compressor 1.1 is used, the controller is replaced preferably by a P controller of PID controller.

As is evident from FIG. 2a, a switching contact 6 in the electrical line 2.1.1 of the sensor 2.1 is controlled by the recirculating-air flap 5.1. When the flap 5.1 is actuated, the evaluation unit 1.5 is supplied with a lower constant temperature value $t_{ic}$, e.g. 10° C., instead of the recorded current value of the interior temperature $t_i$. This ensures that, in this operating state, the compressor is always switched on and consequently the recirculating air is dehydrated. The value of the relative humidity of the outside air $\phi a$ is supplied to a further memory element 1.5.5, which generates a signal that displaces the operating state of the recirculating-air flap 5.1 in the direction of recirculating-air for a defined period of time. This opens the switch contact 6 and provides relief for the cooling circuit of the air conditioning system.

As is also evident from FIG. 2a, still further signals can be supplied to the memory element 1.5.2, namely via a connection 7.1, signals from seat sensors in the vehicle, which thus represent an indication of the number of people in the vehicle, via a connection 7.2, a signal dependent on the nominal value of the interior temperature and, via a connection 7.3, rotational speed signals of the fan 1.4. The signals of the seat sensors cause the characteristic curve $\phi as$ in the memory element 1.5.2 to be lowered in the direction of the ordinate axis towards the abscissa, more or less according to the number of people. Hence a signal for switching on the compressor is generated earlier, to reduce the humidity of the air supplied depending on the number of people, so that the interior air can absorb the additional humidity given off by the passengers without the windows misting over. The rotational speed signal, formed at a defined rotational speed of the fan, causes a raising of the characteristic curve $\phi as$, so that a signal for switching on the compressor is generated later by the memory element. This takes into account the fact that more humidity can be drawn off on the basis of the higher air throughput of the fan. However, the signal dependent on the nominal value of the interior temperature causes either a raising or a lowering of the characteristic curve $\phi$as within certain predetermined limits depending on whether a higher than nominal value lowering the characteristic curve, or a lower than nominal value raising the characteristic curve, is set for the interior temperature by the passenger, so that the comfort of the passenger can be taken into account.

Within the framework of a further development, the temperature dependency of the sensor 2.4 ($\phi$a) can be compensated in consideration of the signal of the sensor 2.3 ($t_a$) in a compensating element 8 of the evaluation unit, so that the temperature-compensated signal of the sensor 2.4 is supplied to the memory element 1.5.2.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Process for the control of parameters of the interior air in a motor vehicle, which is equipped with an air conditioning system consisting of a compressor, fan, condenser, evaporator and heating element and having an evaluation unit, the evaluation unit being supplied with values, recorded by sensors arranged in the motor vehicle, at least for the interior temperature $t_i$, the outside air temperature $t_a$ and the temperature $t_v$ after the evaporator and correspondingly further processed for controlling the interior temperature, comprising:

supplying the relative humidity of the outside air $\phi$a recorded by a further sensors to the evaluation unit;

forming the difference $(t_1-t_a)$ using said evaluation unit;

forming a first signal using said evaluation unit if $\phi$a at $(t_i-t_a)$ exceeds an associated characteristic curve value $\phi$as from a characteristic curve $\phi$as $=f(t_i-t_a)$ stored in a first memory element of the evaluation unit; and in response to said first signal, reading from a second memory element, in which a characteristic curve of the nominal evaporator blow-out temperature $t_{vSoll}=f(t_i)$ is stored, the value $t_{vSoll}$ at the recorded value $t_i$ and switching on the compressor via a regulator element of the controller when the recorded value $T_v$ is greater than $t_{vSoll}$ at the recorded value $t_i$.

2. Process according to claim 1, including lowering the characteristic curve $\phi$as in the direction of the ordinate axis to the abscissa in response to signals from seat sensors in the vehicle.

3. Process according to claim 1, including raising the characteristic curve $\phi$as in the direction of the ordinate axis away from the abscissa in response to rotational speed signals of the fan.

4. Process according to claim 1, including supplying a lower fixed temperature value $t_{ic}$ to the evaluation unit instead of the recorded current value of the interior temperature $t_i$ when a recirculating air flap is deliberately actuated for the recirculating air operating state.

5. Process according to claim 1, including displacing the operating state of a recirculating air flap more in the direction of fresh air or recirculating air for a defined period of time in response to an output from a third memory element in the evaluation unit as a function of the value of the relative humidity of the outside air $\phi$a.

6. Process according to claim 1, including compensating the recorded relative humidity of the outside air $\phi$a as a function of the value recorded of the outside air temperature $t_a$.

7. Process according to claim 1, including raising or lowering the characteristic curve $\phi$as in the direction of the ordinate axis with certain limits in response to a signal dependent on the nominal value of the interior temperature.

8. A processor for the control of parameters of the interior air in a motor vehicle, which is equipped with an air conditioning system consisting of a compressor, fan, condenser, evaporator and heating element and having an evaluation unit, the evaluation unit being supplied with values, recorded by sensors arranged in the motor vehicle, at least for the interior temperature $t_i$, the outside air temperature $t_a$ and the temperature $t_v$ after the evaporator and correspondingly further processed for controlling the interior temperature, comprising:

a further sensor for recording the relative humidity of the outside air $\phi$a and supplying it to the evaluation unit;

a subtraction means in the evaluation unit for forming the difference $(t_i-t_a)$;

a first memory means of the evaluation unit for storing a characteristic curve $\phi$as $=f(t_i-t_a)$;

means for forming a first signal if $\phi$a at $(t_i-t_a)$ exceeds the associated characteristic curve value $\phi$as from the first memory means at $(t_i-t_a)$;

second memory means for storing a characteristic curve of the nominal evaporator blow-out temperature $t_{vSoll}=f(t_i)$;

comparator means, responsive to said first signal for producing an output signal for switching on the compressor via a regulator element of the controller when the recorded value $t_v$ is greater than $t_{vSoll}$ at the recorded value $t_i$.

9. A processor according to claim 8, including seat sensors in the vehicle for supplying signals to the first memory means of the evaluation unit which seat sensor signals lower the characteristic curve $\phi$as in the direction of the ordinate axis to the abscissa.

10. A processor according to claim 8, including a fan rotational speed sensor for supplying signals to the first memory means of the evaluation unit, which fan sensor signals raise the characteristic curve $\phi$as in the direction of the ordinate axis away from the abscissa.

11. A processor according to claim 8, including means for supplying a lower fixed temperature value $t_{ic}$ to the evaluation unit instead of the recorded current value of the interior temperature $t_i$ when a recirculating air flap is deliberately actuated for the recirculating air operating state.

12. A processor according to claim 8, including a third memory means in the evaluation unit, depending on the value of the relative humidity of the outside air $\phi$a supplied thereto, for displacing the operating state of a recirculating air flap more in the direction of fresh air or recirculating air for a defined period of time.

13. A processor according to claim 8, including compensating means of the evaluation unit for compensating the recording the relative humidity of the outside air as a function of the value recorded of the outside air temperature $t_a$.

14. A processor according to claim 8, including means for providing a second signal dependent on the nominal value of the interior temperature to the first memory means of the evaluation unit, said first memory means, in response to said second signal, raises or lowers the characteristic curve $\phi$as in the direction of the ordinate axis within certain limits.

* * * * *